June 12, 1956   W. J. INNES   2,749,696
HEADER AND FEEDER CONTROL FOR COMBINES
Filed April 17, 1952   3 Sheets-Sheet 1

INVENTOR.
WILLARD J. INNES
BY
AGENT

June 12, 1956  W. J. INNES  2,749,696
HEADER AND FEEDER CONTROL FOR COMBINES
Filed April 17, 1952  3 Sheets-Sheet 2

INVENTOR.
WILLARD J. INNES.
BY
AGENT

June 12, 1956  W. J. INNES  2,749,696
HEADER AND FEEDER CONTROL FOR COMBINES
Filed April 17, 1952  3 Sheets-Sheet 3

INVENTOR.
WILLARD J. INNES.
BY
AGENT

United States Patent Office

2,749,696
Patented June 12, 1956

2,749,696

HEADER AND FEEDER CONTROL FOR COMBINES

Willard J. Innes, Racine, Wis., assignor to J. I. Case Company, Racine, Wis., a corporation of Wisconsin Application April 17, 1952, Serial No. 282,871

3 Claims. (Cl. 56—21)

This invention relates to harvester-threshers hereafter referred to as combines, and especially to means for automatically controlling the feed of cut grain to the threshing cylinder of such machines.

An object of this invention is to provide means to stop the feed of grain to the cylinder when the amount becomes excessive and tends to stall the motor.

Another object is to provide means to allow the excess grain, which occasionally clogs the cylinder, to be disposed of before additional grain is fed to it.

Another object is to automatically control the feed of grain in proportion to the speed of rotation of the threshing cylinder thus allowing no more grain to be fed to the cylinder than can be properly threshed.

Further objects and advantages to the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

It is considered to be within the scope of this invention to omit the auger A, allowing the grain to pass directly to the rake R. Also contemplated is an arrangement for picking up a windrow, conveying it to the rake R and then to the cylinder to be threshed without departing from the spirit of the invention.

Referring to the drawings, Fig. 1 shows a side view of a combine with parts broken away and in which the sickle bar is continuously driven;

Figure 2:
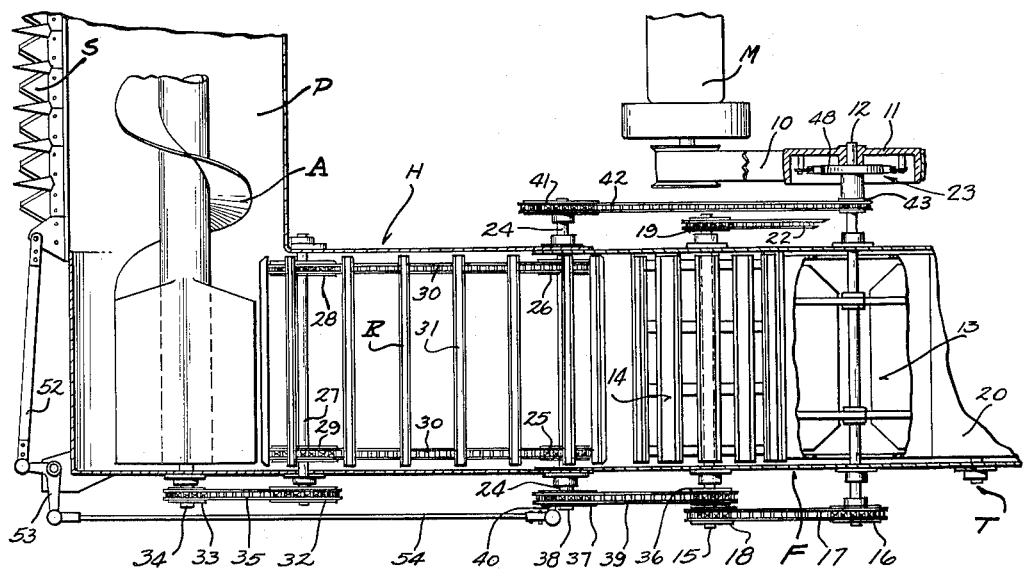
Fig. 2 is a plan view of the arrangement shown in Fig. 1 with parts in section, developed so as to illustrate the arrangement clearly.
Figure 1:
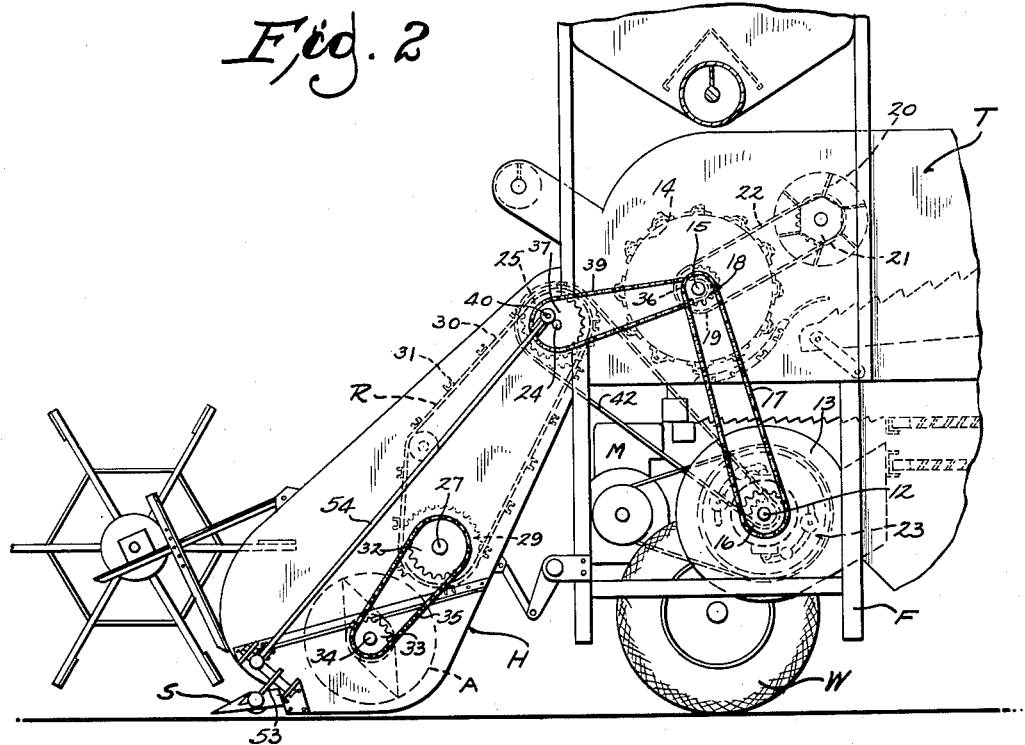

Referring to Figs. 1 and 2, this arrangement has the conventional motor M, a frame F, header H including a pan P, a rake R, a sickle S, the conventional threshing arrangement T and supporting wheels W.

As the combine is transported over the field the grain is cut by the sickle S and falls upon the pan P of header H. Auger A conveys the grain laterally and compacts it into a narrow swath which is then carried upwardly by rake R, and finally passes to the cylinder and concave to be threshed.

Frequently the amount of grain being fed to the cylinder becomes excessive causing the latter to slow down below the proper operating speed of rotation and often tends to stall the motor, resulting in unsatisfactory threshing and considerable loss of grain. The usual remedy in this event is to stop the rake R manually thereby interrupting the flow of grain to the cylinder until the excess has been threshed. With the present arrangements, the operator relies upon his sense of hearing to detect when the choking of the threshing cylinder occurs and then must stop the feeding mechanism manually. This is troublesome and not satisfactory as it requires the constant attention of the operator that should be devoted to other matters, such as transporting the machine over the field, and the maintaining of a proper cutting height. Manual control is wasteful of time in that the operator may allow the cylinder to clear itself entirely of grain and momentarily rotate without having any grain fed to it.

It is believed that this invention corrects the above mentioned difficulties, and it will now be described in detail.

Motor M is suitably mounted upon frame F in a convenient position. A belt 10 or other means of power transmission drives a pulley 11 which is fixed or otherwise keyed to rotate with a main shaft 12, the latter having in this instance affixed thereto a fan 13 of the usual type.

A threshing cylinder 14 having a shaft 15 is located forwardly from the shaft 12 and is journaled in suitable bearings on frame F. Cylinder 14 is driven positively through a sprocket 16 secured to main shaft 12, a chain 17 and a sprocket 18 on shaft 15. The other end of shaft 15 in this instance carries a sprocket 19 which drives a beater 20 through a sprocket 21 and chain 22. Thus the fan 13, cylinder 14 and beater 20 run constantly, thus properly threshing the grain which has been fed to the cylinder, if the amount of grain is not excessive.

The harvesting and feeding mechanism comprises the header H having a pan P, sickle S, auger A and rake R.

The header H is pivoted in this instance on frame F about a shaft 24. Thus the sickle S can be raised or lowered, by conventional means not shown, to accommodate the various conditions encountered in the field. Shaft 24 is journaled on the frame F and extends beyond the frame a suitable amount at each end. Shaft 24 carries sprockets 25 and 26 which are secured integrally thereto and which comprise the drive for the rake R. The lower end of the rake R is supported by the shaft 27 which is journaled in the header H. Sprockets 28 and 29 are secured to shaft 27 for rotation therewith and are similar to sprockets 25 and 26.

The feed rake R comprises a pair of conventional chains 30 connected by slats 31 and is mounted upon sprockets 25, 26, 28 and 29. Thus it is clear that when shaft 24 rotates shaft 27 will also rotate. A sprocket 32 is secured to the end of shaft 27 so as to provide a drive for the auger A. A sprocket 33 is secured to the protruding end of the auger shaft 34. A chain 35 provides the means of driving the auger whenever the rake R is operating.

Shaft 15 has affixed thereto a sprocket 36. A sprocket 37 is mounted upon shaft 24 but rotates freely thereon, being prevented from axial movement by a collar 38 or similar means of fastening. A chain 39 transmits power from the sprocket 36 to sprocket 37. The sprocket 37 is provided with a crank pin 40, the function of which will be fully described later.

It is to be understood that sprocket 37 may also be mounted upon an independent idler stud and placed in any convenient position on frame F. Shaft 24 in the present instance provides a convenient means of journaling sprocket 37.

Figure 3:
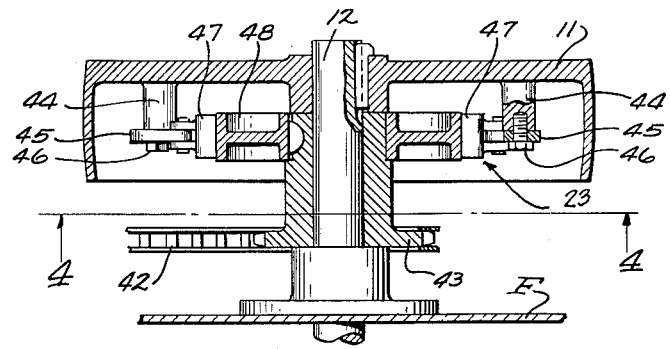
Fig. 3 is an enlarged sectional axial view through the drive pulley and governor with a portion of the shaft broken away.
Figure 4:
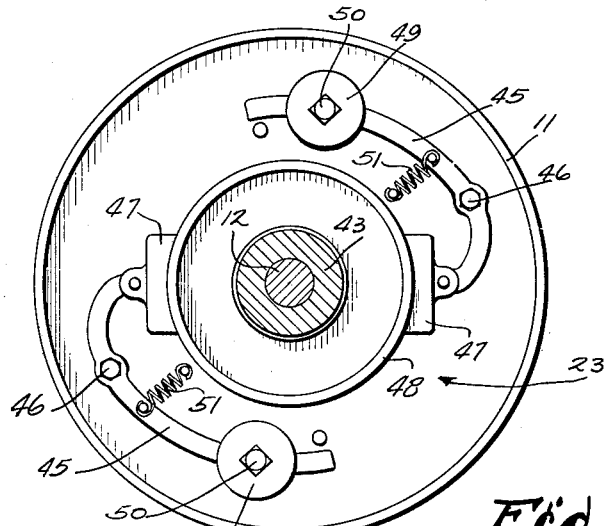
Fig. 4 is a view taken at 4—4 of Fig. 3.
Figure 5:
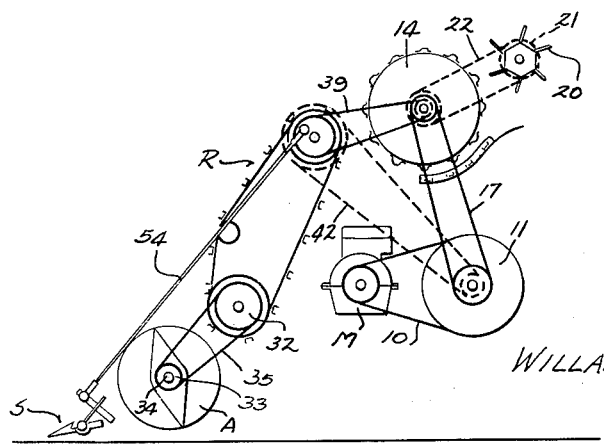
Fig. 5 is an enlarged sectional diagrammatic view of the drives of the arrangement shown in Figs. 1 and 2, the dotted lines showing drives on the far side of the combine.

The end of shaft 24 opposite the sprocket 37 is provided with a sprocket 41, which is driven by a chain 42 from a sprocket 43. Sprocket 43 is freely journaled on main shaft 12 but is frictionally and intermittently driven by a clutch 23 cooperating with the pulley 11. The function of clutch 23 is to allow the sprocket 43 to slip when the load of grain being fed to the cylinder becomes excessive, or in other words, when the cylinder speed of rotation is reduced, resulting in a reduction in the speed of main shaft 12. This function will be explained by reference to the enlarged view of the clutch 23. (See Figs. 3 and 4.)

Pulley 11 has integral therewith studs 44. Pivoted to studs 44 are lever arms 45 held to the studs by screws 46. Friction shoes 47 are pivoted to the ends of lever arms 45 and contact a drum 48. Drum 48 and sprocket 43 is an integral unit in this instance and rotates freely upon main shaft 12. Centrifugal weights 49 are adjustably held on lever arms 45 by screws 50, and can be adjusted along arms 45 so as to change the period at which the feed is excessive and should be interrupted by slipping of the clutch.

Sickle S is of the conventional type and is secured to the forward edge of the header H. A pitman 52, bell crank 53 and crank pitman 54 form the drive for the sickle S. Crank pitman 54 is journaled upon the crank pin 40 and is prevented from axial displacement in a conventional manner.

The operation of this invention will now be explained.

Proper threshing speeds have been established for various grains and it is important that the speed be kept constant. The primary reason for maintaining a constant speed is to insure proper threshing and avoid the loss of grain. If the speed is excessive the grain may be bruised and straw be broken resulting in poor separation: If the speed is too slow the grain will be squeezed through between the concave and cylinder and not be threshed.

Motor M in the conventional tractor drawn combine provides the motive power to operate the various drives. The transport means is independently controlled and will not be described here. The combine may also be of a self-propelled type in which the motor also provides transport power.

Motor M in this instance drives pulley 11 through belt 10, causing fan 13, cylinder 14 and sprocket 37 to rotate, the latter operating the sickle bar S through crank pin 40.

When the pulley 11 has attained the proper speed, weights 49 will move outwardly by centrifugal force, and the frictional contact of shoes 47 upon drum 48 will increase and compel the sprocket 43 to rotate with pulley 11. Sprocket 43 drives rake R through chain 42. Thus when motor M transmits the proper speed to the cylinder 14 for the threshing operation, the clutch 23 will also drive the feed elements, namely the rake R and auger A. This will continue until, for some reason, such as an excessive amount of grain being fed to the cylinder, the cylinder speed is reduced below a predetermined number of revolutions per minute. This is most likely to happen when a field is encountered which is heavily grown, and the amount of grain being fed to the cylinder becomes excessive. The result of excessive feeding is to choke the cylinder, thereby reducing the speed and resulting in incomplete threshing. When choking takes place in a combine arranged as contemplated with this invention, the reduction in speed of the cylinder reduces the speed of main shaft 12 and allows the springs 51 to counteract against the weights 49 and urge the arms 45 inwardly toward the main shaft 12 thus reducing the pressure of shoes 47 upon the drum 48 allowing the latter to reduce its speed or to stop entirely if the speed of the cylinder should drop below the predetermined amount. The revolutions per minute at which the feed will stop can be determined by adjusting the position of weights 49 on lever arms 45. Adjusting the weights 49 toward studs 44 reduces the point of slipping of clutch 23 to a lower number of revolutions per minute of the cylinder and vice versa.

When choking has occurred, the cylinder continues to rotate and clear itself of excesive grain but the feed mechanism will have stopped until the excess amount of grain has been threshed and the cylinder has again attained the original and proper speed, at which time the feed will again automatically be resumed. This arrangement, however, continues to operate the sickle bar without interruption so that all grain passed over will be cut and fall into the pan P and the adjacent auger A and be subsequently fed to the rake R when the feed has again been resumed. This arrangement prevents passing over grain without cutting it, and makes it unnecessary to back up to cut this grain.

The principal objection to stopping the operation of the sickle bar when clearing out the cylinder is that some grain may be passed over by the stationary sickle and be pinched, thereby pulling the grain up by the roots. It is clear that a continuously running sickle bar will prevent this. Thus the operator can continue to transport the machine over the field without special attention as to overloading of the cylinder, the clutch 23 automatically protecting it from overload caused by large accumulations of grain. The grain thus cut by the continuously-operating sickle will fall into the auger trough awaiting the resumption of the auger drive. This will be resumed as soon as the excess of grain has been disposed of.

Figure 7:
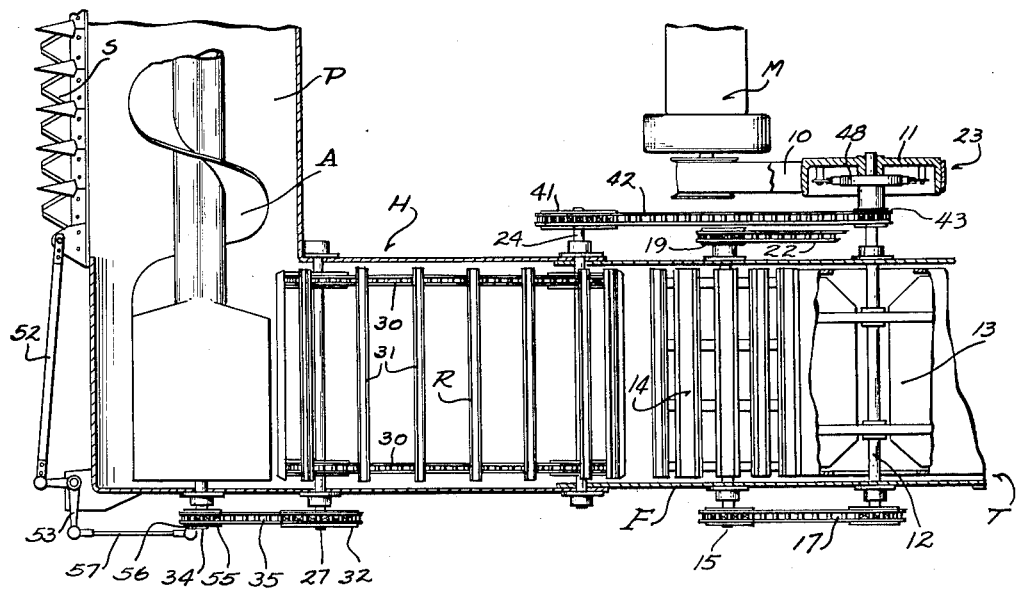
Fig. 7 is a plan view of the arrangement shown in Fig. 6.
Figure 6:
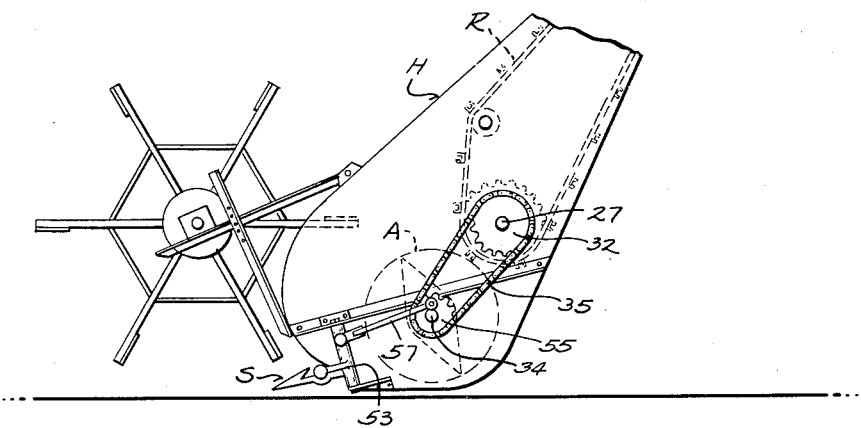
Fig. 6 is a fragmentary side view of a modification with parts broken away and in which the sickle bar operates only when the rake is operated.

There may be instances where it is not objectionable to stop the sickle bar when the feeder is stopped. Such an arrangement may be justified primarily because of economy of manufacture, and which arrangement is shown in Figs. 6 and 7. In this modification, a sprocket 55 is secured to the shaft 34, and has extending outwardly therefrom a crank pin 56 of the type usually employed to operate the pitmans of the sickle bar. A pitman 57 connects the pin 56 with the bell-crank 53. As the sickle bar in this arrangement is driven from the rake R, the former will stop cutting when the rake R stops. This arrangement eliminates several parts such as the sprocket 36, sprocket 37, chain 39 and the long pitman 54, as shown in Figs. 1 and 2.

The arrangement shown in Figs. 6 and 7 is similar in operation to that shown in Figs. 1 and 2 with the following exceptions: Should an excessive amount of grain be encountered which reduces the speed of rotation of the threshing cylinder, the clutch 23 will release the sprocket 43 and thus stop sprocket 41 which in turn drives rake R. Shaft 27 drives sickle S and auger A through sprockets 32 and 55, and chain 35. Thus when rake R stops operating, auger A and sickle S also stop.

The above being a complete description of an illustrative embodiment of the invention, what is claimed as new and desired to be secured by Letters Patent of the United States is:

1. In an implement having a main shaft, a cylinder, a feed rake having an upper and a lower shaft, an auger and a cutting means, in combination, a pulley fixed to said main shaft to be driven by a source of power, positive drive means from said main shaft to said cylinder, a clutch member associated with said pulley and drivingly engaging the latter at a definite rate of rotation of said cylinder, drive means from said clutch member to said upper shaft, drive means from said lower shaft to said auger, a sprocket having a crank member and freely journaled on said upper shaft for independent rotation thereon, drive means from said cylinder to said crank member and a connecting member from said crank member to said cutting means to oscillate the latter.

2. In an implement having a frame, a main shaft, a cylinder, a feed rake having an upper and a lower shaft, an auger and a cutting means, in combination, a pulley fixed to said main shaft to be driven by a source of power, constant drive means from said main shaft to said cylinder, a clutch member associated with said pulley and drivingly engaging the latter at a definite rate of rotation of said cylinder, drive means from said clutch member to said upper shaft, drive means from said lower shaft to said auger, a sprocket having a crank member and freely journaled on said frame, constant drive means from said main shaft to said sprocket and connecting means between said crank member and said cutting means to oscillate the latter.

3. In an implement having a frame, a main shaft, a cylinder, a feed rake having an upper and lower shaft, an auger and a cutting means, in combination, a pulley fixed to said main shaft to be driven by a source of power, constant drive means from said main shaft to said cylinder, a clutch member freely journaled on said shaft and frictionally engageable with said pulley at a predetermined rate of rotation of said pulley, drive means from said clutch member to said upper shaft, drive means from said lower shaft to said auger, a sprocket having a crank member and freely journaled on said frame, constant drive means to said sprocket and connecting means between said crank member and said cutting means to oscillate the latter.

References Cited in the file of this patent

UNITED STATES PATENTS

| | | |
|---|---|---|
| 1,220,901 | States | Mar. 27, 1917 |
| 1,325,691 | Crandall et al. | Dec. 23, 1919 |
| 1,471,894 | Hartley | Oct. 23, 1923 |
| 1,820,570 | Krause | Aug. 25, 1931 |
| 2,123,879 | Charley | July 19, 1938 |